United States Patent
Smith et al.

(10) Patent No.: US 9,615,502 B1
(45) Date of Patent: Apr. 11, 2017

(54) ADJUSTABLE AGRICULTURAL IMPLEMENT DRIVESHAFT ASSEMBLY HOLDER AND IMPLEMENT FITTED WITH SAME

(71) Applicant: Alamo Group Inc., Seguin, TX (US)

(72) Inventors: Steven L. Smith, Valley Grande, AL (US); Jack Harrington, Montgomery, AL (US)

(73) Assignee: Alamo Group Inc., Seguin, TX (US)

( * ) Notice: Subject to any disclaimer, the term of this patent is extended or adjusted under 35 U.S.C. 154(b) by 0 days.

(21) Appl. No.: 15/196,379

(22) Filed: Jun. 29, 2016

(51) Int. Cl.
*A01B 59/06* (2006.01)
*A01B 71/02* (2006.01)
*A01B 59/00* (2006.01)
*A01B 59/042* (2006.01)

(52) U.S. Cl.
CPC ............ *A01B 71/02* (2013.01); *A01B 59/002* (2013.01); *A01B 59/042* (2013.01)

(58) Field of Classification Search
CPC ...... A01B 71/02; A01B 59/002; A01B 59/042
USPC ............... 248/286.1; 172/677, 679, 668, 439
See application file for complete search history.

(56) References Cited

U.S. PATENT DOCUMENTS

| | | | |
|---|---|---|---|
| 2,614,405 A | 7/1947 | Clauen | |
| 2,885,015 A | 5/1959 | Koch et al. | |
| 2,956,808 A | 10/1960 | Miller | |
| 3,897,841 A | 8/1975 | Phillips et al. | |
| 3,924,391 A | 12/1975 | Cheatum | |
| 4,020,913 A | 5/1977 | Yatcilla | |
| 4,058,990 A | 11/1977 | von Allwörden | |
| 4,071,105 A | 1/1978 | von Allwörden | |
| 4,099,594 A | 7/1978 | Smith et al. | |
| 4,174,661 A | 11/1979 | Mathes et al. | |
| 4,446,783 A | 5/1984 | Illy | |
| 4,541,570 A | 9/1985 | Rieke et al. | |
| 4,588,323 A | 5/1986 | Vollmer et al. | |
| 4,640,378 A | 2/1987 | Dobberpuhl et al. | |
| 5,303,789 A | 4/1994 | Adamson et al. | |
| 5,706,901 A | 1/1998 | Walters et al. | |
| 6,015,016 A | 1/2000 | Anderson et al. | |
| 7,278,502 B2 * | 10/2007 | Trefz | A01B 71/063 180/53.1 |
| 7,287,364 B2 | 10/2007 | Wright | |

(Continued)

OTHER PUBLICATIONS

Land Pride Fold-Away PTO Support, excerpts from User Manual and photos of Support, RC4615 Rotary Cutter w/ Support Bracket, & Land Pride RC4615 Features & Benefits, Dec. 18, 2015.

*Primary Examiner* — Todd M Epps
(74) *Attorney, Agent, or Firm* — Cook Alex Ltd.

(57) ABSTRACT

A holder unit facilitates secure, safe and adjustable connection between an agricultural implement and a draft vehicle such as a tractor. The holder unit mounts to the tongue of the implement and engages a portion of a drivetrain, allowing the drivetrain to rest on a saddle of the holder unit. The holder unit features three adjustability orientations, a fore-and-aft adjustability, a height adjustability and a saddle pivot adjustability. These adjustability orientations are easily combined by the user to achieve accurate alignment for PTO-to-drivetrain connection irrespective of variations between the draft vehicle and the implement drivetrain connector device respective orientations and terrain unevenness.

20 Claims, 5 Drawing Sheets

(56) References Cited

U.S. PATENT DOCUMENTS

| | | | |
|---|---|---|---|
| 7,461,702 B2 * | 12/2008 | Farnsworth | A01B 59/066 172/439 |
| 7,490,799 B2 | 2/2009 | Young et al. | |
| 7,784,255 B2 | 8/2010 | Moore, Jr. et al. | |
| 7,862,068 B2 | 1/2011 | Schlesser et al. | |
| 7,980,338 B2 | 7/2011 | Steffensen et al. | |
| 8,096,571 B1 * | 1/2012 | Noe | B60D 1/02 180/53.4 |
| 2016/0037726 A1 | 2/2016 | Horner et al. | |

* cited by examiner

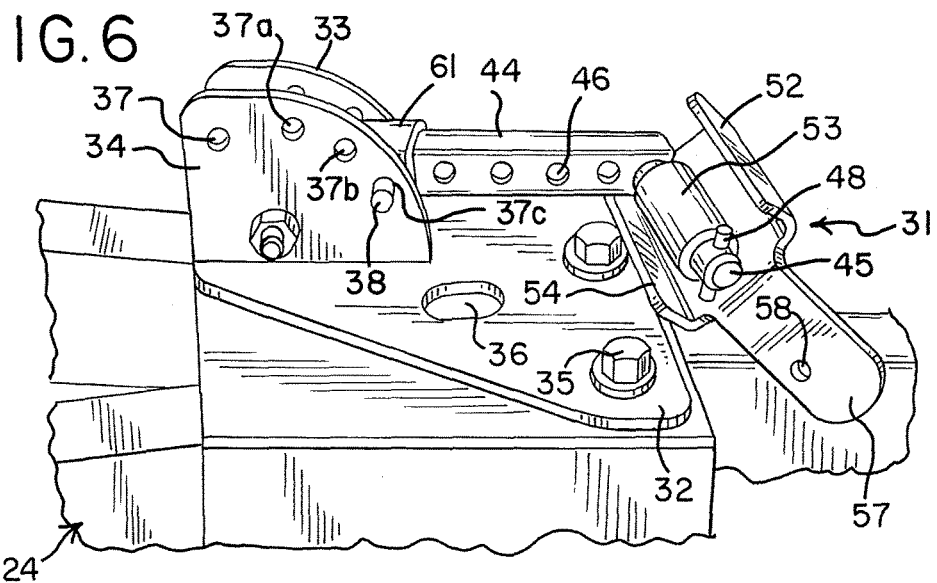
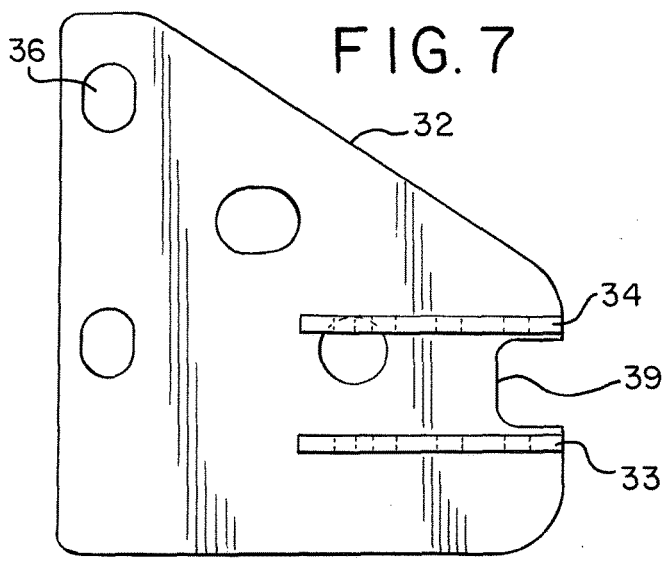
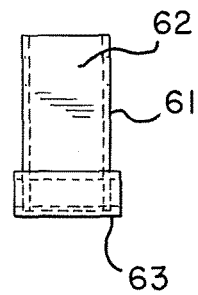
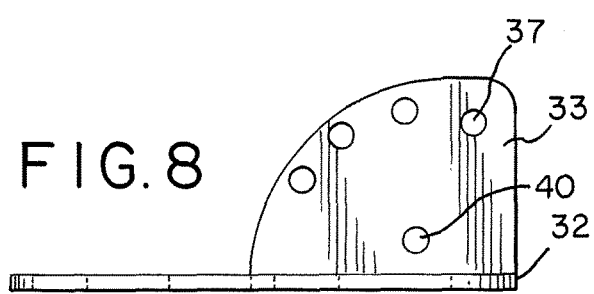
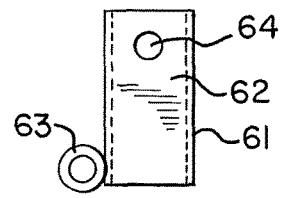

ADJUSTABLE AGRICULTURAL IMPLEMENT DRIVESHAFT ASSEMBLY HOLDER AND IMPLEMENT FITTED WITH SAME

BACKGROUND

Field of the Disclosure

The present subject matter generally relates to agricultural implements having a draft tongue or bar that attaches to the hitch assembly of a suitable powered vehicle such as a tractor, which tractor also provides power to operate mechanisms of the implement by way of power-take-off (PTO) engagement with the drive shaft assembly of the implement.

Description of Related Art

Agricultural implements, particularly larger implements, feature a robust drive shaft assembly that is not rigidly mounted so as to allow for the intended driven connection with a power-take-off (PTO) of many of a variety of draft vehicles such as a tractors that come in a several different sizes and configurations. Over the years, support assemblies have been devised to avoid unwanted movement of implement drive shaft assemblies before the drive shaft assembly is safely, completely and securely attached to the PTO mechanism. Some such support assemblies engage the implement drive shaft assembly and extend downwardly to engage the ground below the drive shaft assembly. Other supports connect the implement drive shaft assembly with a draft tongue or bar of the implement.

Examples of the structures and details of previously devised supports of these types are found in U.S. Pat. No. 2,614,405 "Power Take-Off Coupling", U.S. Pat. No. 4,020,913 "Tongue-Mounted Yieldable PTO Driveline Support", U.S. Pat. No. 4,099,594 "Tongue-Mounted Assembly for Supporting an Implement Drivetrain", U.S. Pat. No. 6,015,016 "Stowable Driveline Connection Aid for Power-Driven Farm Implements", U.S. Pat. No. 7,490,799 "Multi-Position Support for PTO Drive", U.S. Pat. No. 7,862,068 "Connector Constructed for Connecting a Jack to an Implement Draft Tongue and for Supporting a PTO Drive Shaft Assembly", and U.S. Pat. No. 7,980,338 "Agricultural Implement Having Apparatus for Stowing PTO Driveline Shaft when the PTO Driveline Shaft is Not in Use". PTO supports include those that are of the "fold-away" type, but allowing for only very limited adjustability for accommodating different sizings and location situations that vary according to the implement drivetrain assembly or driveline/clutch assembly of the implement as well as the height, orientation and adjustability of the PTO assembly of the draft vehicle. To the extent these types of prior supports offer any ability to adjust for differences among implement and draft vehicle connection mechanisms and sizings, each typically requires the use of tools in order to adjust height, for example.

SUMMARY OF THE DISCLOSURE

There are several aspects of the present subject matter which may be embodied separately or together in the devices, implements and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, an adjustable agricultural implement driveshaft assembly holder is provided that combines a base plate, a height and pivotable support adjustment assembly and a connector configured to engage and connect together the base plate with the height and pivotable support adjustment assembly. The base plate includes a pair of upstanding side plates, and the height and pivotable support adjustment assembly includes a height adjustment component. Each of a side plate and the height adjustment component has a plurality of spaced-apart connection members. A connector engages and assembles the side plate and the height adjustment component at selected respective connection members in order to achieve adjustment to accommodate the particular situation needing to be addressed with respect to the implement drivetrain component and the draft vehicle PTO accommodations. Further, the height and pivotable support adjustment assembly has a saddle component pivotally mounted to the height adjustment component for further accommodation of the particular situation.

In another aspect, an adjustable agricultural implement driveshaft assembly holder is provided that combines a base plate, a height and pivotable support adjustment assembly and a connector configured to engage and connect together the base plate with the height and pivotable support adjustment assembly. The base plate includes a pair of upstanding side plates, and the height and pivotable support adjustment assembly includes a height adjustment component. Each of a side plate and the height adjustment component has a plurality of spaced-apart openings. A quick-connect pin engages and assembles the side plate and the height adjustment component at selected respective openings in order to achieve adjustment to accommodate the particular situation needing to be addressed with respect to the implement drivetrain component and the draft vehicle PTO accommodations. Further, the height and pivotable support adjustment assembly has a saddle component pivotally mounted to the height adjustment component for further accommodation of the particular situation.

In yet another aspect, an adjustable agricultural implement driveshaft assembly holder is provided that combines a base plate, a height and pivotable support adjustment assembly and a connector configured to engage and connect together the base plate with the height and pivotable support adjustment assembly. The base plate includes a pair of upstanding side plates, and the height and pivotable support adjustment assembly includes a height adjustment component. Each of a side plate and the height adjustment component has a plurality of spaced-apart connection members. A sleeve having a sleeve pivot tube positioned along a generally horizontal axis and a sleeve connection member spaced upwardly from the sleeve pivot tube is positioned within the height adjustment component. The pivot tube pivotally mounts the sleeve along the height adjustment component. A connector engages and assembles the side plate, the sleeve and the height adjustment component at selected respective connection members in order to achieve adjustment to accommodate the particular situation needing to be addressed with respect to the implement drivetrain component and the draft vehicle PTO accommodations. Further, the height and pivotable support adjustment assembly has a saddle component pivotally mounted to the height adjustment component for further accommodation of the particular situation.

In a further aspect, an adjustable agricultural implement driveshaft assembly holder is provided that combines a base plate, a height and pivotable support adjustment assembly and a connector configured to engage and connect together the base plate with the height and pivotable support adjustment assembly. The base plate includes a pair of upstanding side plates, and the height and pivotable support adjustment assembly includes a height adjustment component. Each of a side plate and the height adjustment component has a plurality of spaced-apart connection members. A sleeve having a sleeve pivot tube positioned along a generally horizontal axis and a sleeve connection member spaced upwardly from the sleeve pivot tube is positioned within the height adjustment component. The pivot tube pivotally mounts the sleeve along the height adjustment component. A connector engages and assembles the side plate, the sleeve and the height adjustment component at selected respective connection members in order to achieve adjustment to accommodate the particular situation needing to be addressed with respect to the implement drivetrain component and the draft vehicle PTO accommodations. Further, the height and pivotable support adjustment assembly has a saddle component pivotally mounted to a pivot member of the height adjustment component for further variation of the attitude of the saddle component different from a horizontal attitude, thereby providing further accommodation for the draft vehicle and implement structure and positioning, including accommodation for non-horizontal aspects of the terrain on which the vehicle and implement are positioned before and during connection therebetween.

In an additional aspect, an adjustable agricultural implement driveshaft assembly holder is provided that combines a base plate, a height and pivotable support adjustment assembly and a connector configured to engage and connect together the base plate with the height and pivotable support adjustment assembly. The base plate includes a pair of upstanding side plates, and the height and pivotable support adjustment assembly includes a height adjustment component. Each of a side plate and the height adjustment component has a plurality of spaced-apart openings. A sleeve having a sleeve pivot tube positioned along a generally horizontal axis and a sleeve connection member spaced upwardly from the sleeve pivot tube is positioned along the height adjustment component. The pivot tube pivotally mounts the sleeve along the height adjustment component. An elongated connector engages and assembles the side plate, the sleeve and the height adjustment component at their selected respective openings in order to achieve adjustment to accommodate the particular situation needing to be addressed with respect to the implement drivetrain component and the draft vehicle PTO accommodations. Further, the height and pivotable support adjustment assembly has a U-shaped saddle component pivotally mounted to the height adjustment component for further accommodation of the particular situation.

In one other aspect, an agricultural implement has a tongue portion and a drivetrain assembly. An adjustable agricultural implement driveshaft assembly holder is secured to the tongue portion. The adjustable holder has a base plate, a height and pivotable support adjustment assembly, and a connector configured to engage and connect together the base plate with the height and pivotable support adjustment assembly. The base plate includes a pair of upstanding side plates, and the height and pivotable support adjustment assembly includes a height adjustment component. Each of a side plate and the height adjustment component has a plurality of spaced-apart connection members. A connector engages and assembles the side plate and the height adjustment component at selected respective connection members in order to achieve adjustment to accommodate the particular situation needing to be addressed with respect to the implement drivetrain component and the draft vehicle PTO accommodations. Further, the height and pivotable support adjustment assembly has a saddle component pivotally mounted to the height adjustment component for further accommodation of the particular situation.

In yet another aspect, an agricultural implement has a tongue portion and a drivetrain assembly. An adjustable agricultural implement driveshaft assembly holder is secured to the tongue portion. The adjustable agricultural implement driveshaft assembly holder combines a base plate, a height and pivotable support adjustment assembly and a connector configured to engage and connect together the base plate with the height and pivotable support adjustment assembly. The base plate includes a pair of upstanding side plates, and the height and pivotable support adjustment assembly includes a height adjustment component. Each of a side plate and the height adjustment component has a plurality of spaced-apart connection members. A sleeve having a sleeve pivot tube positioned along a generally horizontal axis and a sleeve connection member spaced upwardly from the sleeve pivot tube is positioned within the height adjustment component. The pivot tube pivotally mounts the sleeve along the height adjustment component. A connector engages and assembles the side plate, the sleeve and the height adjustment component at selected respective connection members in order to achieve adjustment to accommodate the particular situation needing to be addressed with respect to the implement drivetrain component and the draft vehicle PTO accommodations. Further, the height and pivotable support adjustment assembly has a saddle component pivotally mounted to the height adjustment component for further accommodation of the particular situation.

In a further aspect, an agricultural implement has a tongue portion and a drivetrain assembly. An adjustable agricultural implement driveshaft assembly holder is secured to the tongue portion. The adjustable agricultural implement driveshaft assembly holder is provided that combines a base plate, a height and pivotable support adjustment assembly and a connector configured to engage and connect together the base plate with the height and pivotable support adjustment assembly. The base plate includes a pair of upstanding side plates, and the height and pivotable support adjustment assembly includes a height adjustment component. Each of a side plate and the height adjustment component has a plurality of spaced-apart connection members. A sleeve having a sleeve pivot tube positioned along a generally horizontal axis and a sleeve connection member spaced upwardly from the sleeve pivot tube is positioned within the height adjustment component. The pivot tube pivotally mounts the sleeve along the height adjustment component. A connector engages and assembles the side plate, the sleeve and the height adjustment component at selected respective connection members in order to achieve adjustment to accommodate the particular situation needing to be addressed with respect to the implement drivetrain component and the draft vehicle PTO accommodations. Further, the height and pivotable support adjustment assembly has a saddle component pivotally mounted to a pivot member of the height adjustment component for further variation of the attitude of the saddle component different from a horizontal attitude, thereby providing further accommodation for the draft vehicle and implement structure and positioning, including accommodation for non-horizontal aspects of the terrain on which the vehicle and implement are positioned before and during connection therebetween.

BRIEF DESCRIPTION OF THE DRAWINGS

FIG. 6 is a perspective view along the lines of FIG. 4, but with the holder unit in a collapsed or stored position for transport of the implement;

FIG. 7 is a top plan view of an embodiment of a base plate component of the holder;

FIG. 8 is a side elevational view of the base plate component of FIG. 7, with a side plate shown in elevation;

FIG. 9 is a front elevational view of an embodiment of the sleeve component, shown in place in FIG. 6;

FIG. 10 is a side elevational view of the sleeve component of FIG. 9;

DESCRIPTION OF THE ILLUSTRATED EMBODIMENTS

The embodiments disclosed herein are for the purpose of providing the required description of the present subject matter. They are only exemplary, and may be embodied in various forms. Therefore, specific details disclosed herein are not to be interpreted as limiting the subject matter as defined in the accompanying claims.

Figure 1:
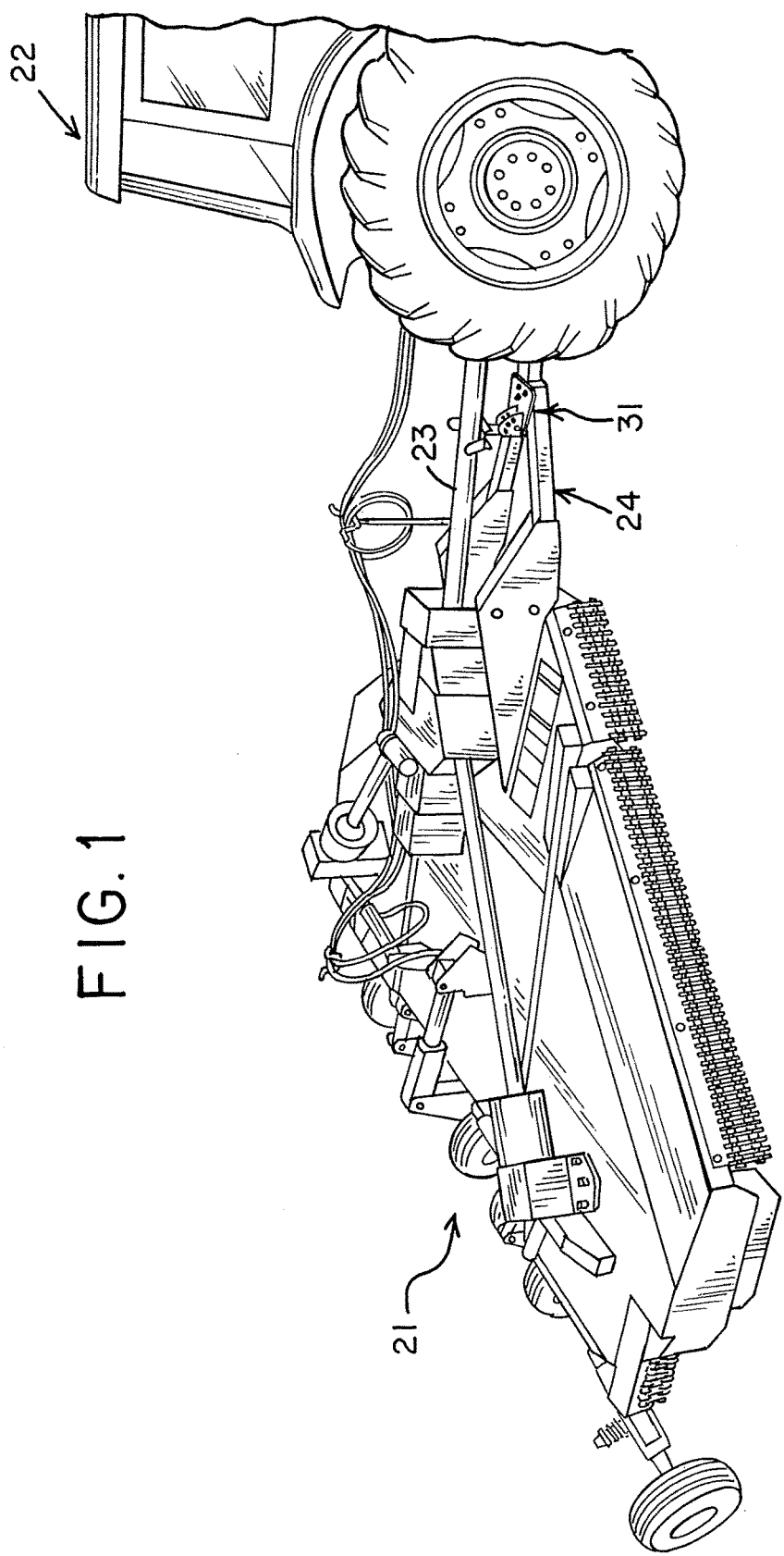
FIG. 1 is a perspective view of an implement including the adjustable driveshaft assembly holder mounted onto the tongue of the implement and supporting the drivetrain component of the implement upon connection to the draft vehicle, shown broken away.

FIG. 1 is an illustration of a typical implement, generally designated at 21, including the adjustable holder. Associated with the implement is shown a typical draw vehicle, a tractor, generally designated at 22. The vehicle and the implement are shown during or just after hitching of the implement to the draw vehicle, with the drivetrain component or driveshaft assembly or driveline/clutch assembly 23 of the implement oriented for connection with the PTO (not shown) of the draw vehicle 22. The implement illustrated is a wide-swath rotary cutter of the flex-wing style of known construction to those skilled in the art. The draft tongue of this illustrated implement is generally designated at 24.

Other implements, whether rotary cutters or not, can benefit from the improvements of this disclosure.

An embodiment of the adjustable driveshaft assembly holder or drivetrain component holder is generally designated at 31, at times referred to as the holder unit. The holder unit 31 of the present disclosure allows the operator to rest the drivetrain component 23 such as a driveline/clutch assembly on the holder unit 31 such that the drivetrain component is more closely aligned with the PTO shaft for installation. Once the drivetrain component is attached to the draw vehicle 22, the holder is structured to fold down out of the way while the implement is in operation. The multiple adjustments have the important features of allowing the operator to easily vary configurations and positions for connection of the implement to the draw vehicle.

Figure 2:
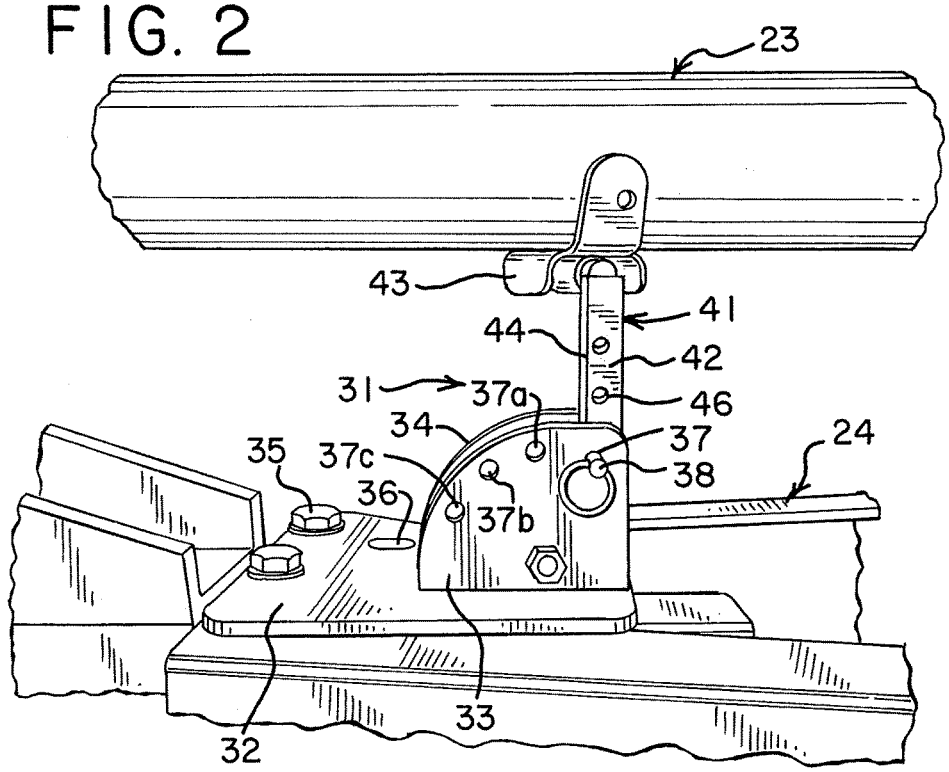
FIG. 2 is a detail side perspective view of an embodiment of the adjustable agricultural implement driveshaft assembly holder mounted to an implement draft tongue and supporting a drivetrain component of the implement, shown in a generally vertical support attitude.

Further details of the adjustable implement driveshaft assembly holder or drivetrain component holder are apparent from FIG. 2 and following figures, shown assembled in FIGS. 3, 4, 5 and 6. A base plate 32 includes a side plate 33 upwardly oriented. A companion side plate 34 also is depicted and is typically included. One or both of the side plates 33, 34 can be manufactured integrally with the bottom member of the base plate 32, or one or both can be securely attached, by way of welding for example. When both side plates are provided they typically are substantially parallel to each other and substantially perpendicular to the bottom member of the base plate. The base plate 32 typically bolts to the draft tongue 24; an embodiment of this is shown in the drawings by way of bolts 35 and holes 36 for releasable securing the holder unit 31 to the draft tongue by any suitable structure such as holes or slots (not shown). Such an arrangement facilitates a retrofit aspect to the holder unit 31, which can be added to implements already manufactured and/or in use.

At least one of the side plates 33, 34 has a plurality of spaced-apart connection members 37, which can take any form suitable for rapid connection and disconnection when desired to utilize a connection member different from one currently in use. For simplicity the connection members 37 are illustrated by openings of various shapes such as circular holes. Whatever form or shape of the connection members 37, they are structured to receive a connector 38 as described in more detail herein. With further reference to the base plate 32, it is advantageous to include a cut-away 39 through the rear portion of the bottom member of the base plate 32, by providing clearance for downward movement of a height adjustment member as discussed elsewhere herein.

Figure 11:
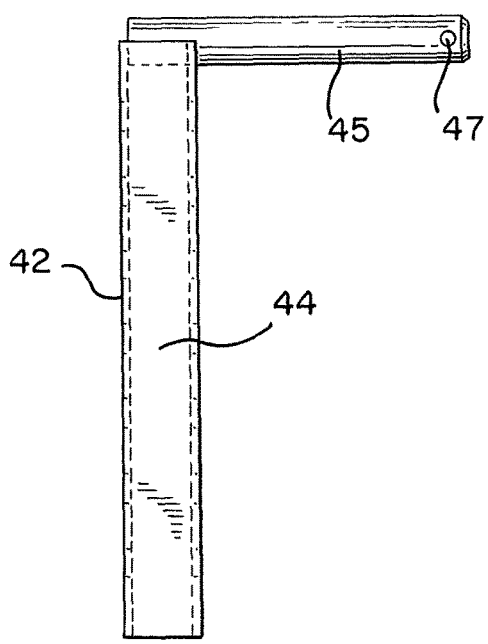
FIG. 11 is a rear elevational view of an embodiment of a height and pivotable support adjustment assembly of the holder.
Figure 12:
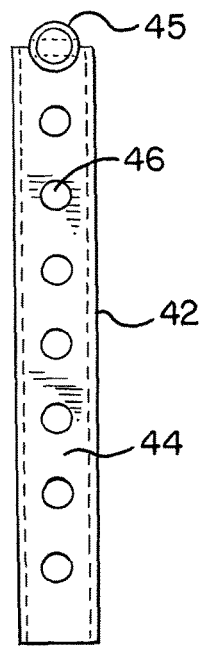
FIG. 12 is a side elevational view of the height and pivotable support adjustment assembly of FIG. 11.
Figure 13:
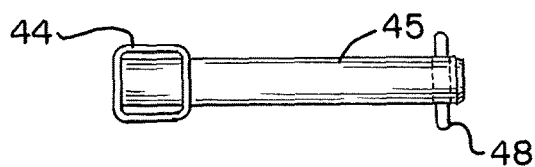
FIG. 13 is a top plan view of the height and pivotable support adjustment assembly of FIG. 11.

A further component of the holder unit 31 is a height and pivotable support adjustment assembly, generally designated at 41. Assembly 41 has two basic members, a height adjustment component 42 and a saddle component 43. Height adjustment component 42 is illustrated in greater detail in FIGS. 11, 12 and 13, and saddle component 43 is illustrated in greater detail in FIGS. 14 and 15. Height adjustment component is composed of an arm 44 and a pivot rod 45. Arm 44 has a plurality of spaced-apart connection members 46 that can take on any form suitable for rapid connection and dis-connection to facilitate adjustability of the holder unit. Typically the connection members 46 will be openings for receiving an elongated member in the assembly approach discussed elsewhere herein. The illustrated connection members are holes sized and shaped to closely but slidably receive the elongated member 38. The pivot rod 45 includes a structure or approach to prevent unintended movement of the saddle component 43 off of the pivot rod, once assembled together. In the illustrated embodiment, this takes the form of a bore 47 to receive a roll pin 48 or the like as seen in FIG. 4 and FIG. 13.

Figure 14:
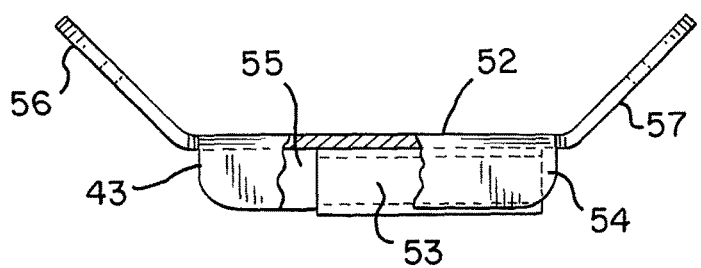
FIG. 14 is a front elevational view of the saddle component of the holder.
Figure 15:
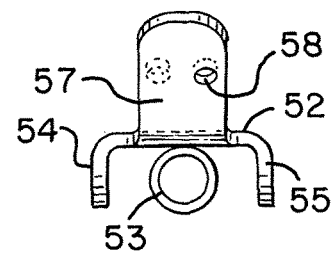
FIG. 15 is a side elevational view of the saddle component of FIG. 14.

In the illustrated embodiment, the saddle component 43, as best seen in FIGS. 14 and 15, has a support plate 52 and a pivot channel 53 positioned on the undersurface of the support plate 52. In the illustrated embodiment, support plate 52 has downturned lateral edges 54, 55 that help in locating the implement's drivetrain component 23 onto the holder unit 31. The illustrated support plate further includes upturned ends 56, 57 that form a generally U-shaped saddle for secure reception of the drivetrain component 23. The upturned ends each can feature one or more receptors 58 such as holes to receive a tie down (not shown) for providing extra security by wrapping over a drivetrain component once it is properly positioned on the saddle and oriented to the proper height and angle needed for the particular implement and draft vehicle.

FIGS. 9 and 10 provide details of a sleeve member 61 that can be included. When provided, the sleeve member has a sleeve component 62 and a sleeve pivot component 63 that is located along a panel of the sleeve component. Sleeve component 62 further includes a connection member 64 such as a hole or opposing holes. The connection member 64 receives the connector 38 as described in more detail herein such that the connector 38 and the sleeve pivot component 63 are substantially parallel to each other when the holder unit is fully assembled as described herein.

Figure 4:
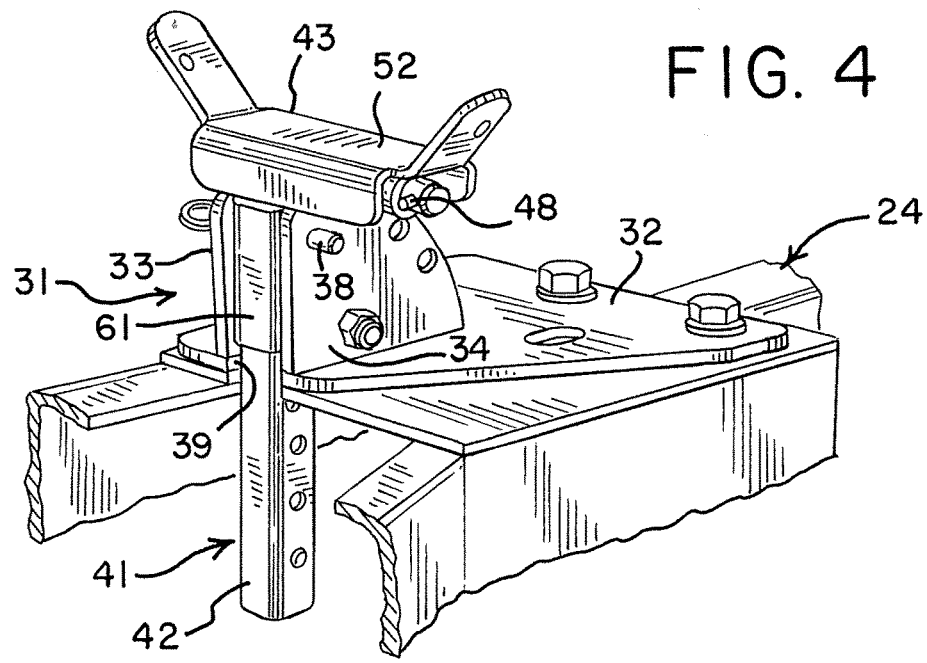
FIG. 4 is a perspective view generally from the front side of the adjustable agricultural implement driveshaft assembly holder according to an aspect of the present disclosure, with a rear-facing portion of the implement draft tongue broken away.
Figure 5:
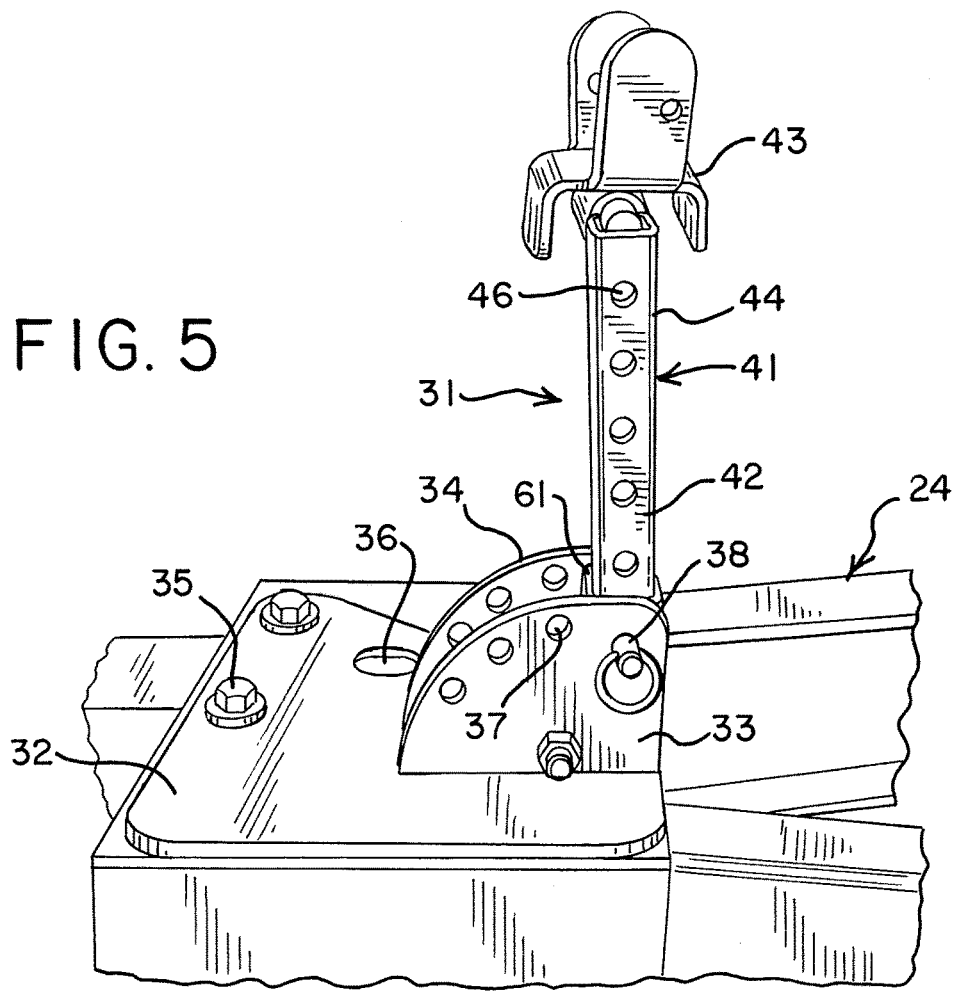
FIG. 5 is a perspective view generally from the back side of the adjustable agricultural implement driveshaft assembly holder according to an aspect of the present disclosure, with a portion of the implement draft tongue broken away.

With more particular reference to the assembled holder unit or drivetrain component holder or driveshaft assembly holder 31, FIGS. 2, 4 and 5 depict the holder unit 31 with the height adjustment arm 42 in a substantially vertical orientation. It will be appreciated that, at this angular adjustment location for the adjustment arm 42, one of the support connection members 46 is aligned with the rear-most connection member 37 of the side plate or plates. This alignment is secured by the connector 38 such as a quick-connect pin that is illustrated. Height adjustability of the holder unit 31 is seen from differences in overall height as between FIGS. 2, 4 and 5.

Figure 3:
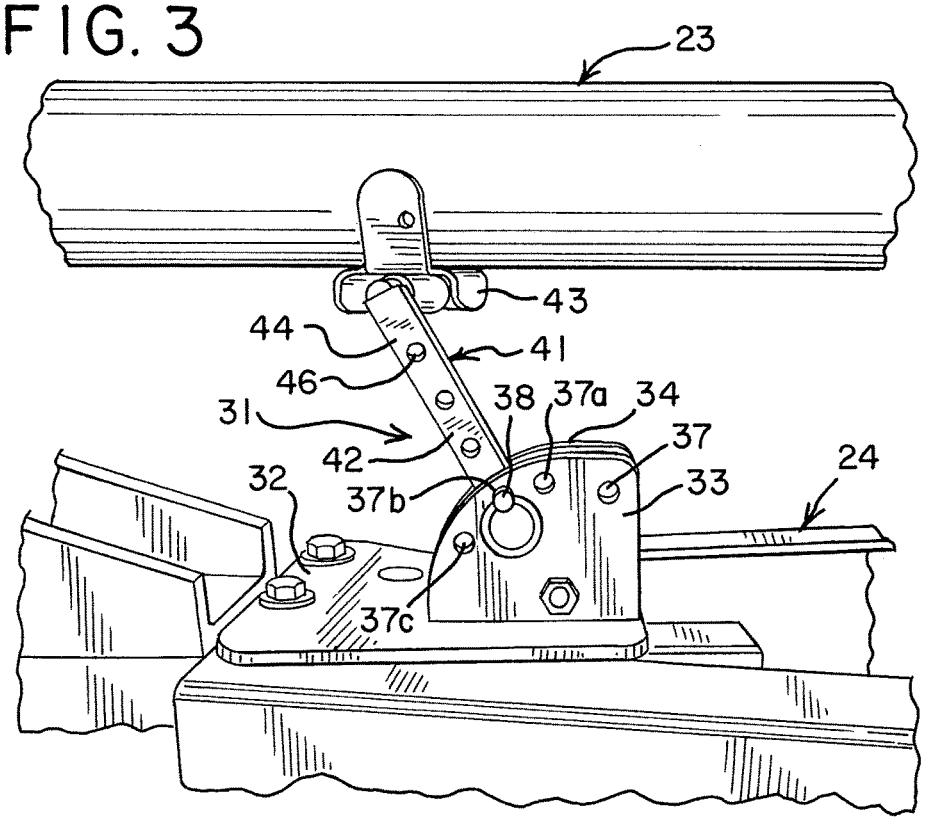
FIG. 3 is a detail side perspective view of the embodiment shown in FIG. 2 of the adjustable agricultural implement driveshaft assembly holder mounted to an implement draft tongue and supporting a drivetrain component of the implement, shown in a support attitude different from that shown in FIG. 2.

By way of further illustration, FIG. 3 depicts the height adjustment arm 42 in an intermediate orientation with a different one of its connection members 46 aligned with an intermediate connection member 37b of the side plate or side plates 33, which alignment is secured by the connector 38. This orientation provides a fore-and-aft adjustability pattern while also allowing for height adjustment and angular orientation fine tuning in association with the other adjustability features of the present disclosure, including adjustment of the height of the height adjustment arm 42 per se and pivoting adjustment associated with the saddle component 43. Angular orientation adjustment can accommodate height differences between the PTO connection and the end of the drivetrain component 23, which allows for a substantial number of adjustment combinations that are especially beneficial when carrying out the attachment task on ground that is not level.

By way of additional illustration, FIG. 6 depicts the transport mode for the holder unit 31, at which the holder unit 31 is folded down and out of the way for implement towing and operation. In this transport mode, one of the connector members 46 aligns with the forward-most and lower-most connection member 37c of the side plate or plates 34.

FIGS. 2, 4 and 5 illustrate different height adjustability of the substantially vertical orientation of the height adjustment component 42. FIG. 5 depicts the maximum height setting for the height adjustment component 42; and FIG. 2 depicts and intermediate setting when the height adjustment component is substantially vertical. FIG. 4 depicts the minimum height setting for the height adjustment component 42; at this setting, clearance for the height adjustment component 42 to a location at which a portion of the height adjustment component is below the base plate 32 is facilitated by the rear-facing cut-away 39 of the base plate. It is also possible this clearance feature is utilized when the height adjustment component is at a height above that shown in FIG. 4.

It will be appreciated that all potential adjustment positions of the holder unit 31 are not depicted in the drawings. Focusing on the cooperation of the height adjust component's height adjustment capabilities with the adjustment options provided by the fore-and-aft adjustment features, FIG. 3 provides one illustration of the fine tuning that is provided by the present disclosure. As will be appreciated, if the operator were to select a different fore-and-aft adjustment, such as aligning with the connection member 37a, the angular orientation from vertical would be less than shown in FIG. 3. Also, by selecting a different height per se adjustment, such as aligning with a higher or lower connector member 46, the extent of reach of the holder unit 31 at any given fore-and-aft angular selection is easily modified to provide more precise alignment between the PTO connection and the drivetrain component 23 supported by the holder unit 31. Whatever alignment is selected is easily sustained when the connector 38 is installed by the operator.

Focusing next on the pivoting adjustment provided by the saddle component 43 in cooperation with the other adjustability features of the present disclosure, as noted previously, the saddle component 43 is not rigidly secured to the height adjustment component 42. Instead, the angular orientation of the support plate 52 is variable to provide a non-parallel relationship between the support plate 52 and the implement tongue 24 (or base plate 32) if such an accommodation is needed when the terrain and/or height differences between the PTO and the implement drivetrain component are not otherwise in alignment. This saddle pivot adjustability allows pivoting by the mounting of the pivot channel 53 along the pivot rod 45 of the height adjustment component 42.

When provided, the sleeve member 61 facilitates securement of the height adjustment component 42 to the side plate or plates 33, 34, while allowing both the height per se adjustment action and the fore-and-aft adjustment action. In the illustrated arrangement, the sleeve member is slidably secured to the height adjustment component 42 by any suitable structure.

The illustrated structure of the sleeve member 61 has the height adjustment component 42 slidably positioned within the sleeve member 61 in that the inside surface of the sleeve member 61 is sized and shaped to closely receive and accommodate the height adjustment component in a manner such that its connecting member 64 aligns with the connecting member 46 of the height adjustment component that the operator has selected. This alignment is secured by the connector 38. In the illustrated embodiment, these aligned connecting members 46 and 64 are secured by a pin, such as the illustrated quick-release pin. Further, the sleeve member 61 is pivotally connected to the side plate or plates 33, 34, having a sleeve connecting member or members 40, at the sleeve pivot component 63 of the sleeve member 61. In the illustrated embodiment, this pivotable connection is secured by a connector 65 that is a pin which can take the form of a bolt secured in place by a nut or similar item. Thus, the sleeve member helps to secure the height adjust and pivotable support assembly 41 to the base plate 32 while allowing both the fore-and-aft adjustability and the height per se adjustability described herein.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims.

The invention claimed is:

1. An adjustable agricultural implement driveshaft assembly holder comprising:
 a. a base plate configured to be secured to a tongue portion of an agricultural implement, the base plate having a pair of generally parallel side plates extending upwardly from the base plate, at least one of the side plates having a plurality of spaced-apart side plate connection members;
 b. a height and pivotable support adjustment assembly having a height adjustment component and a saddle component pivotally mounted to the height adjustment component, the saddle component being of a variable height and configured to pivot so as to supportingly receive the implement's driveshaft, the height adjustment component having a plurality of spaced-apart height adjustment connection members configured for interaction with said side plate connection members in adjusting the height of the saddle component; and
 c. a connector configured to engage and connect together a selected one of the side plate connection members with a selected one of the height adjustment connection members, whereby both the height of the saddle component and the height adjustment component's angle from vertical are selected.

2. The driveshaft holder according to claim 1, wherein the connector is a quick-release pin.

3. The driveshaft holder according to claim 1, further including a sleeve having a sleeve pivot component positioned along a generally horizontal axis and connected to a side plate, the sleeve further including a sleeve connection member spaced upwardly from the sleeve pivot component and positioned along a generally horizontal axis, wherein the connector further engages and connects together the sleeve connection member with the selected one of the side plate connection members and the selected one of the height adjustment connection members.

4. The driveshaft holder according to claim 3, further including a rod securing the sleeve pivot component to the pair of side plates.

5. The driveshaft holder according to claim 3, wherein each of the connection members are openings that receive the connector.

6. The driveshaft holder according to claim 3, further including a height adjustment component pivot member of the height adjustment component, the height adjustment component pivot member is positioned along an axis, wherein the axis of the height adjustment component pivot member is substantially parallel to the axis of the sleeve pivot component.

7. The driveshaft holder according to claim 1, wherein the saddle component is generally U-shaped with opposing upturned end wings, the saddle component being sized to supportingly accommodate the implement's driveshaft.

8. The driveshaft holder according to claim 7, wherein the wings of the saddle component each includes an opening for receiving a tie down for securing the implement's driveshaft within the saddle component.

9. An adjustable agricultural implement driveshaft assembly holder comprising:
 a. a base plate configured to be secured to a tongue portion of an agricultural implement, the base plate having a pair of generally parallel side plates extending upwardly from the base plate, at least one of the side plates having a plurality of spaced-apart side plate openings;
 b. a height and pivotable support adjustment assembly having a height adjustment component and a saddle component pivotally mounted to the height adjustment component, the saddle component being of a variable height and configured to pivot so as to supportingly receive the implement's driveshaft, the height adjustment component having a plurality of spaced-apart height adjustment openings configured for interaction with said side plate openings in adjusting the height of the saddle component;
 c. a quick-release pin configured to engage and connect together a selected one of the side plate openings with a selected one of the height adjustment openings, whereby both the height of the saddle component and the height adjustment component's angle from vertical are selected;
 d. a sleeve having a sleeve pivot tube positioned along a generally horizontal axis and a sleeve opening spaced upwardly from the sleeve pivot tube and positioned along a generally horizontal axis, wherein the quick-release pin further engages and connects together the sleeve opening with the selected one of the side plate openings and the selected one of the height adjustment openings; and
 e. a rod securing the sleeve pivot component to the pair of side plates.

10. The driveshaft holder according to claim 9, further including a height adjustment component pivot member of the height adjustment component, the height adjustment component pivot member is positioned along an axis, wherein the axis of the height adjustment component pivot member is substantially parallel to the axis of the sleeve pivot component.

11. The driveshaft holder according to claim 9, wherein the saddle component is generally U-shaped with opposing upturned end wings, the saddle component being sized to supportingly accommodate the implement's driveshaft.

12. The driveshaft holder according to claim 11, wherein the wings of the saddle component each includes an opening for receiving a tie down for securing the implement's driveshaft within the saddle component.

13. The driveshaft holder according to claim 9, wherein the sleeve pivot tube is located between and connected to the side plates.

14. An agricultural implement having an adjustable agricultural implement driveshaft assembly holder comprising:
 a. a base plate configured to be secured to a tongue portion of an agricultural implement, the base plate having a pair of generally parallel side plates extending upwardly from the base plate, at least one of the side plates having a plurality of spaced-apart side plate connection members;
 b. a height and pivotable support adjustment assembly having a height adjustment component and a saddle component pivotally mounted to the height adjustment component, the saddle component being of a variable height and configured to pivot so as to supportingly receive a driveshaft of the implement, the height adjustment component having a plurality of spaced-apart height adjustment connection members configured for interaction with said side plate connection members in adjusting the height of the saddle component; and c. a connector configured to engage and connect together a selected one of the side plate connection members with a selected one of the height adjustment connection members, whereby both the height of the saddle component and the height adjustment component's angle from vertical are selected.

15. The agricultural implement according to claim 14, wherein the connector is a quick-release pin.

16. The agricultural implement according to claim 14, further including a sleeve having a sleeve pivot component positioned along a generally horizontal axis and a sleeve connection member spaced upwardly from the sleeve pivot component and positioned along a generally horizontal axis, wherein the connector further engages and connects together the sleeve connection member with the selected one of the side plate connection member and the selected one of the height adjustment connection members.

17. The agricultural implement according to claim 16, further including a rod securing the sleeve pivot component to the pair of side plates.

18. The agricultural implement according to claim 16, wherein each of the connection members are openings that receive the connector.

19. The agricultural implement according to claim 16, further including a height adjustment component pivot member of the height adjustment component, the height adjustment component pivot member positioned along an axis, wherein the axis of the height adjustment component pivot member is substantially parallel to the axis of the sleeve pivot component.

20. The agricultural implement according to claim 14, wherein the saddle component is generally U-shaped with opposing upturned end wings, the saddle component being sized to supportingly accommodate the driveshaft, and each of the wings includes an member for receiving a tie down to secure the driveshaft within the saddle component.

* * * * *